US011913269B2

(12) United States Patent
McDonald

(10) Patent No.: US 11,913,269 B2
(45) Date of Patent: Feb. 27, 2024

(54) VERTICAL FOLDING WALL PARTITION AND METHOD OF DEPLOYING SAME

(71) Applicant: Skyfold Inc., Baie d'Urfe (CA)

(72) Inventor: Mark McDonald, Beaconsfield (CA)

(73) Assignee: SKYFOLD INC., Baie-d'Urfe (CA)

( * ) Notice: Subject to any disclaimer, the term of this patent is extended or adjusted under 35 U.S.C. 154(b) by 591 days.

(21) Appl. No.: 16/872,587

(22) Filed: May 12, 2020

(65) Prior Publication Data

US 2020/0270923 A1 Aug. 27, 2020

Related U.S. Application Data

(62) Division of application No. 15/707,451, filed on Sep. 18, 2017, now Pat. No. 10,683,689.
(Continued)

(51) Int. Cl.
*E05D 15/26* (2006.01)
*E05F 15/605* (2015.01)
(Continued)

(52) U.S. Cl.
CPC .............. *E05D 15/262* (2013.01); *E04B 2/82* (2013.01); *E04B 9/001* (2013.01); *E04B 9/008* (2013.01);
(Continued)

(58) Field of Classification Search
CPC ...... E05D 15/262; E05F 15/60; E05F 15/605; E04B 2/82; E04B 9/001; E04B 9/008; E04B 3/48; E04B 9/003; E06B 3/483; E06B 3/94; E06B 9/06; E06B 9/0661; E06B 9/0676; E06B 9/0669
See application file for complete search history.

(56) References Cited

U.S. PATENT DOCUMENTS 958,961 A 5/1910 Henning
5,062,464 A 11/1991 Peterson
(Continued)

FOREIGN PATENT DOCUMENTS

WO WO-2013167379 A1 * 11/2013 ............... E06B 9/13
WO 2014053059 4/2014

OTHER PUBLICATIONS

Machine translation of WO-2013167379-A1.*

*Primary Examiner* — Daniel P Cahn
*Assistant Examiner* — Jeremy C Ramsey
(74) *Attorney, Agent, or Firm* — NORTON ROSE FULBRIGHT CANADA

(57) ABSTRACT

A folding wall partition includes foldable panel assemblies. Each panel assembly includes an upper panel and a lower panel. The upper and lower panels extend substantially in a common vertical plane when in a deployed position, and extend laterally outwardly of the common vertical plane in a stacked relationship when in a stored position. A moving mechanism engages the panel assemblies to displace them between the stored and deployed positions. A cover assembly has cover panels. The cover panels extend in a first common horizontal plane when in the deployed position and are substantially coplanar with the ceiling to conceal a cavity. The cover panels extend in a second common horizontal plane higher than the first common horizontal plane and within the cavity when the cover panels are in the stored position.

9 Claims, 11 Drawing Sheets

Related U.S. Application Data

(60) Provisional application No. 62/397,481, filed on Sep. 21, 2016.

(51) Int. Cl.

| | |
|---|---|
| ***E06B 3/48*** | (2006.01) |
| ***E06B 3/94*** | (2006.01) |
| ***E05F 15/60*** | (2015.01) |
| ***E04B 2/82*** | (2006.01) |
| ***E04B 9/00*** | (2006.01) |

(52) U.S. Cl.

CPC ............ *E05F 15/60* (2015.01); *E05F 15/605* (2015.01); *E06B 3/48* (2013.01); *E06B 3/483* (2013.01); *E06B 3/94* (2013.01)

(56) References Cited

U.S. PATENT DOCUMENTS

| | | | | |
|---|---|---|---|---|
| 6,267,169 | B1 | 7/2001 | McDonald | |
| 6,808,000 | B1 | 10/2004 | Peterson | |
| 7,156,142 | B2 | 1/2007 | Peterson | |
| 8,302,654 | B2 | 11/2012 | Mcdonald et al. | |
| 8,327,905 | B2 | 12/2012 | Mcdonald et al. | |
| 8,336,257 | B2 | 12/2012 | Mcdonald et al. | |
| 9,045,935 | B2 | 6/2015 | Mcdonald | |
| 9,273,513 | B2 * | 3/2016 | Breznikar | E06B 9/17076 |
| 9,476,248 | B2 | 10/2016 | Smart | |
| 10,683,689 | B2 * | 6/2020 | McDonald | E05F 15/60 |
| 2011/0036509 | A1 * | 2/2011 | Goodman | E06B 5/164<br>160/1 |
| 2014/0090788 | A1 * | 4/2014 | Mcdonald | E05D 15/262<br>160/188 |
| 2015/0240553 | A1 | 8/2015 | Manning | |

* cited by examiner

VERTICAL FOLDING WALL PARTITION AND METHOD OF DEPLOYING SAME

CROSS-REFERENCE TO RELATED APPLICATIONS

The present application is a divisional of U.S. patent application Ser. No. 15/707,451 filed Sep. 18, 2017, which claims priority on U.S. Patent Application No. 62/397,481 filed Sep. 21, 2016, the entire content of each of which is incorporated herein by reference.

TECHNICAL FIELD

The present invention relates to operable wall partitions and, more particularly, to operable wall partitions which are vertically movable between raised and lowered positions.

BACKGROUND OF THE ART

It is well known to use movable wall partitions to divide larger spaces, such as conference rooms, halls and school gymnasiums, into smaller spaces.

Vertically folding wall partitions are known. Often, the folding wall partition is deployed from a recessed space within a ceiling to divide the larger space, and folded within the same recessed space in the ceiling when stored away. When in the vertical deployed position, however, conventional moveable wall partitions create a noticeable and unsightly void or gap between the partition and the ceiling.

SUMMARY

In one aspect, there is provided a vertical folding wall partition storable within a cavity of a ceiling suspended from an overhead structure, the wall partition comprising: foldable panel assemblies pivotally connected through a series of vertically spaced apart supports, a lowermost of the panel assemblies having a bottom end pivotally connected to a bottom linkage, each panel assembly including an upper panel and a lower panel pivotally connected to one another, the upper and lower panels extending substantially in a common vertical plane when in a deployed position and extending laterally outwardly of the common vertical plane in an opposed surface-to-surface stacked relationship when in a stored position; a cover assembly having cover panels each with a first end being connected to an uppermost of the supports and a second end spaced horizontally away from the first end, the cover panels extending in a first common horizontal plane when in the deployed position and being substantially coplanar with the ceiling to conceal the cavity therein, and extending in a second common horizontal plane being higher than the first common horizontal plane and within the cavity of the ceiling when in the stored position; and a moving mechanism supported by a hanger engageable with the overhead structure, the moving mechanism engaging each support and the bottom linkage to move the panel assemblies and the cover assembly between the stored and deployed positions, the moving mechanism varying a distance between opposed ends of each panel assembly as the panel assemblies are moved between the stored and deployed positions, and the moving mechanism vertically displacing the cover panels relative to the ceiling as the panel assemblies are moved between the stored and deployed positions.

There is also provided a vertical folding wall partition storable within a cavity of a ceiling suspended from an overhead structure, the wall partition comprising: foldable panel assemblies pivotally connected through a series of vertically spaced apart supports, each panel assembly including an upper panel and a lower panel pivotally connected to one another, the upper and lower panels extending substantially in a common vertical plane when in a deployed position of the panel assemblies, and the upper and lower panels extending laterally outwardly of the common vertical plane in an opposed surface-to-surface stacked relationship when in a stored position of the panel assemblies, the panel assemblies forming a fully deployed wall partition in said deployed position; a moving mechanism engaging the panel assemblies to displace them between the stored and deployed positions thereof; and a cover assembly having cover panels each with a first end being connected to an uppermost one of the supports and a second end disposed spaced horizontally away from the first end, the cover panels extending in a first common horizontal plane when in a deployed cover position, the cover panels being substantially coplanar with the ceiling to conceal the cavity therein in said deployed cover position, and the cover panels extending in a second common horizontal plane higher than the first common horizontal plane when the cover panels are in a stored cover position, the cover panels being enclosed within the cavity of the ceiling when in said stored cover position, the cover assembly being displace between the stored cover position and the deployed cover position thereof when the panel assemblies are disposed from the stored and deployed positions thereof.

In another aspect, there is provided a method of deploying a foldable wall partition stored within a cavity of a ceiling, comprising: lowering foldable panel assemblies from the cavity, each panel assembly unfolding from a stacked relationship within the cavity to an upright orientation while being lowered from the cavity; and lowering cover panels from the cavity until the cover panels extend in a common horizontal plane and are substantially coplanar with the ceiling to conceal the cavity therein.

There is also provided a folding wall partition storable within a cavity of a ceiling suspended from an overhead structure, the wall partition comprising: foldable panel assemblies pivotally connected through a series of vertically spaced apart supports, each panel assembly including an upper panel and a lower panel pivotally connected to one another, the upper and lower panels extending substantially in a common vertical plane when in a deployed position and extending laterally outwardly of the common vertical plane in an opposed surface-to-surface stacked relationship when in a stored position; a moving mechanism supported by the overhead structure and engaging the panel assemblies to displace them between the stored and deployed positions; and a cover assembly having cover panels each with a first end being connected to an one uppermost of the supports and a second end spaced horizontally away from the first end, the cover panels being displaceable with the panel assemblies between the stored and deployed positions, the cover panels extending in a first common horizontal plane when in the deployed position and being substantially coplanar with the ceiling to conceal the cavity therein, the cover panels extending in a second common horizontal plane higher than the first common horizontal plane and within the cavity of the ceiling when the cover panels are in the stored position.

There is also provided a method of deploying a foldable wall partition stored within a cavity of a ceiling, comprising: lowering foldable panel assemblies from the cavity, each panel assembly unfolding from a stacked relationship within the cavity to an upright orientation while being lowered from the cavity; and lowering cover panels from the cavity until the cover panels extend in a common horizontal plane and are substantially coplanar with the ceiling to conceal the cavity therein.

BRIEF DESCRIPTION OF THE DRAWINGS

Reference is now made to the accompanying figures in which:

FIG. 2 is a schematic cross-sectional view of a support of the wall partition of FIG. 1A;

DETAILED DESCRIPTION

Figure 1A:
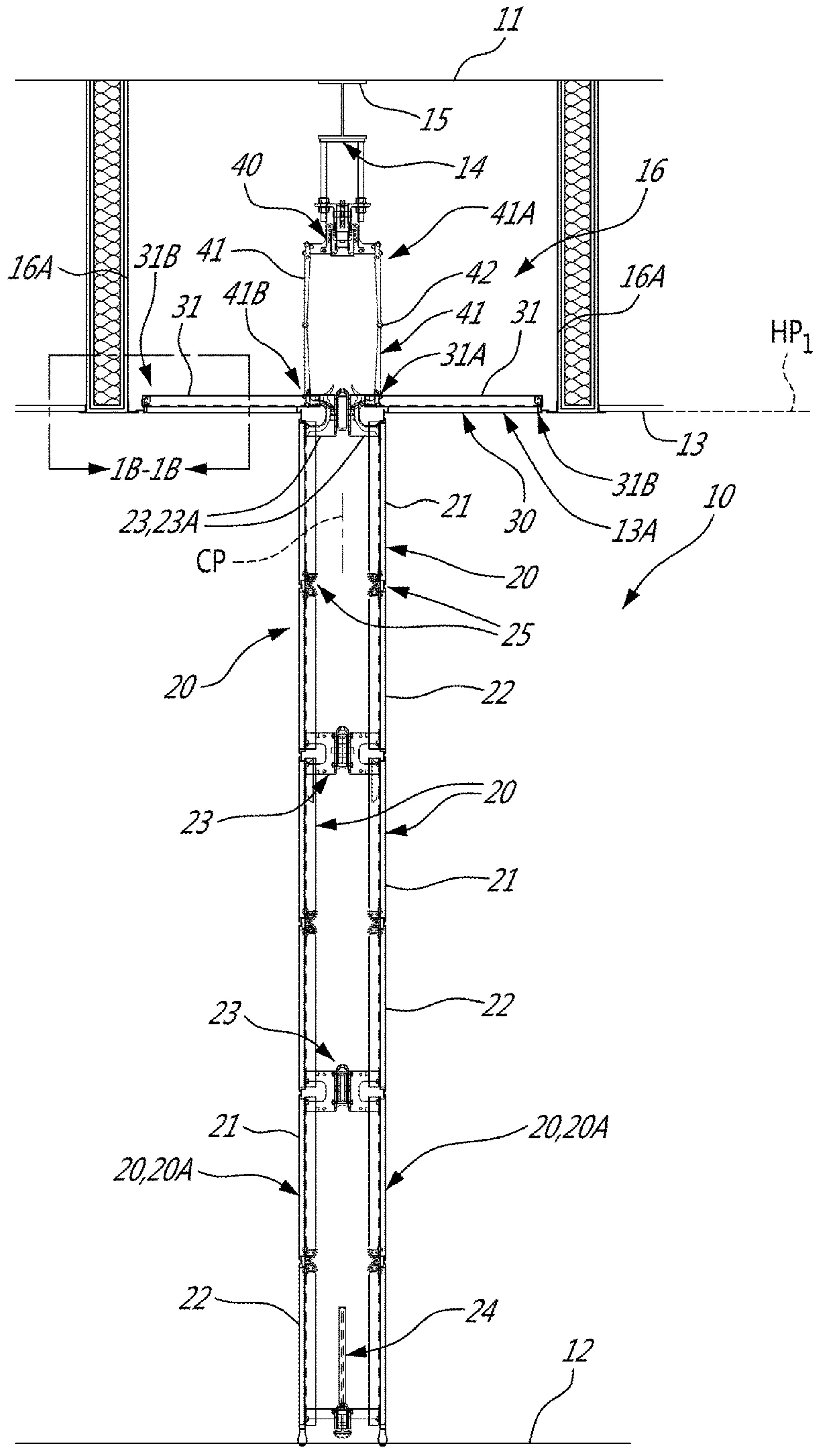
FIG. 1A is a schematic cross-sectional view of a vertical folding wall partition in accordance with an embodiment of the disclosure, shown in a deployed position.

FIG. 1A illustrates a vertical folding wall partition 10. The vertical folding wall partition 10 is adapted to be mounted to an overhead structure 11 of a building, such as a ceiling structure, for movements between a completely folded position, in which the vertical folding wall partition 10 is retracted and raised and may be stored in the ceiling structure, and a deployed position, in which the vertical folding wall partition 10 (sometimes referred to herein simply as "wall partition 10") is unfolded, straight and extends vertically downwardly from the overhead structure 11 to a support surface, such as a floor 12, in order to divide an interior building space into two smaller spaces. In the depicted embodiment, a ceiling 13 is suspended from the overhead structure 11, and a hanger 14 is fixed to the overhead structure 11 through a support plate 15. The ceiling 13 has a cavity 16 therein, which may (but need not necessarily be) defined by vertical cavity walls 16A that are supported by the overhead structure 11 and spaced apart from one another. The wall partition 10 is folded and kept within the cavity 16 when in the stored position (see e.g. FIG. 5D), and unfolds and extends out of the cavity 16 when in the deployed position, as shown in FIG. 1A. In a particular embodiment, the overall dimensions of the vertically folding wall partition 10 are such that when it is displaced to its deployed position, the wall partition 10 forms a substantially uninterrupted flat wall which reaches the floor 12 and thus extends completely across the area to be divided.

The wall partition 10 includes panel assemblies 20 disposed along the vertical direction when the wall partition 10 is in the deployed position. In the embodiment shown, three pairs of panel assemblies 20 are provided, each pair being symmetrically disposed relative to a vertical central plane CP of the wall partition 10, to form a double sided wall partition. The width dimension of the wall partition 10 may be defined by a plurality of panel assemblies 20 interconnected side by side.

Each panel assembly 20 includes an upper panel 21 and a lower panel 22. The upper and lower panels 21,22 can be of a rectangular construction and elongated in the width direction to form a suitable portion of the wall partition 10. The upper and lower panels 21,22 therefore help to provide a solid, planar, unbroken appearance when they are vertically oriented. The upper and lower panels 21,22 are pivotably connected to one another. This pivotable connection allows the upper and lower panels 21,22 to fold towards and away from the central plane CP about a common pivot axis when the wall partition 10 is displaced between the deployed and stored positions. The upper panel 21 of one or more panel assemblies 20 is also pivotably connected to the lower panel 22 of a vertically adjacent and higher panel assembly 20. The pivotable connection between the upper and lower panels 21,22 of the same panel assembly 20, and between the upper and lower panels 21,22 of adjacent panel assemblies 20, defines parallel pivot axes which extend in the width direction when the wall partition 10 is attached to the overhead structure 11. It will thus be appreciated that any suitable structure capable of pivotably connecting the upper and lower panels 21,22 in this manner is within the scope of present disclosure.

For example, and as shown in FIG. 1A, the upper and lower panels 21,22 of adjacent panel assemblies 20 are pivotably connected at adjacent ends through vertically spaced-apart supports 23. Each support 23 is symmetrical relative to the central plane CP, and ensures that the foldable panels 21,22 pivotably connected at their ends thereto and disposed on opposed sides of the central plane CP fold and unfold conjointly. It is understood that other appropriate types of supports may be provided. The lower panels 22 of the lowermost panel assemblies 20A are pivotally mounted at their lower end, through a corresponding transversal passage, to a lowermost support 23, referred to herein as a bottom linkage 24.

As also shown in FIG. 1A, the upper and lower panels 21,22 of the same panel assembly 20 are pivotably connected at adjacent or confronting ends with cooperating spur gears 25. Each mating end of the panels 21,22 has its own spur gear 25 to ensure that the panels 21,22 move outwardly and inwardly at the same rate during contraction and expansion of the wall partition 10. If desired, a bumper pin or other mechanism can extend transversally between the spur gears 25 of the panels 21,22 to limit inward movements of the confronting ends of the panels 21,22 when the wall partition 10 is displaced to its deployed position.

When the wall partition 10 and its components are in the deployed position, as shown in FIG. 1A, the outer face of the panels 21,22 are horizontally spaced from the cavity walls 16A. In conventional folding wall partitions, the interior of the ceiling cavity 16 and its expanse is visible from the floor surface when the wall partition is deployed. Viewing the depth and extent of the ceiling cavity along the entire length of the wall partition may be visually unappealing, and thus undesirable in some instances. In contrast to these conventional folding wall partitions, the wall partition 10 disclosed herein includes a ceiling cavity cover assembly 30 which at least partially conceals the cavity 16 in the ceiling 13 when the wall partition 10 is in the deployed position.

Still referring to FIG. 1A, the cover assembly 30 has cover panels 31 which are oriented substantially horizontally, at least in the deployed position, to substantially cover the opening 13A in the ceiling 13 which provides access to the cavity 16, to thereby conceal the cavity 16 in the ceiling 13. In the depicted embodiment, the cover assembly 30 has two cover panels 31, but more are possible if desired. Each cover panel 31 has a central or inner first end 31A that is connected to an uppermost one of the supports 23A. The first end 31A is the portion of each cover panel 31 positioned closed to the central plane CP when the cover panel 31 is deployed. Each cover panel 31 also has an opposed second end 31B that is horizontally spaced away from the first end 31A. In the depicted embodiment, where the cover assembly 30 is in the deployed position, the second end 31B of each cover panel 31 is disposed in proximity to a corresponding cavity wall 16A. Accordingly, the second end 31B is spaced closely to a corresponding one of cavity walls 16A. In the depicted embodiment, the second end 31B of each cover panel 31 does not abut against the surface of the corresponding cavity wall 16A. The second ends 31B and the cover panels 31 can thus be displaced relative to the cavity walls 16A without generating frictional resistance therewith. It can thus be appreciated that when in the deployed position, each cover panel 31 spans across a horizontal extent of the cavity 16, thereby helping to conceal it. Although shown and described herein as being a component of the wall partition 10, the cover assembly 30 can be separately provided an adapted to operate with an existing vertically folding wall partition.

The cover panels 31 are displaced between the deployed position and the stored position. In the deployed position, and as shown in FIG. 1A, the cover panels 31 extend in a first common horizontal plane $HP_1$ and are substantially coplanar with the ceiling 13 to conceal the cavity 16. In the deployed position, at least an outer, visible planar surface of each cover panel 31 is therefore substantially flush or level with an outer, visible surface of the ceiling 13. The cover panels 31 therefore close off and hide the void of the cavity 16 by spanning to the bottom edges of the cavity walls 16A. In some configurations, the first horizontal plane $HP_1$ defined by the cover panels 31 in the deployed position can be slightly above or slightly below the level of ceiling 13 provided that the cavity 16 remains concealed by the cover panels 31. In the depicted embodiment of the deployed position, the horizontal cover panels 31 align with the finished ceiling 13 to give a continuous and monolithic finished ceiling. In the stored position (see e.g. FIG. 5D), the cover panels 31 extend in a second common horizontal plane $HP_2$ that is higher than first horizontal plane $HP_1$. The second horizontal plane $HP_2$ is also higher than the horizontal plane of the ceiling 13.

Figure 1B:
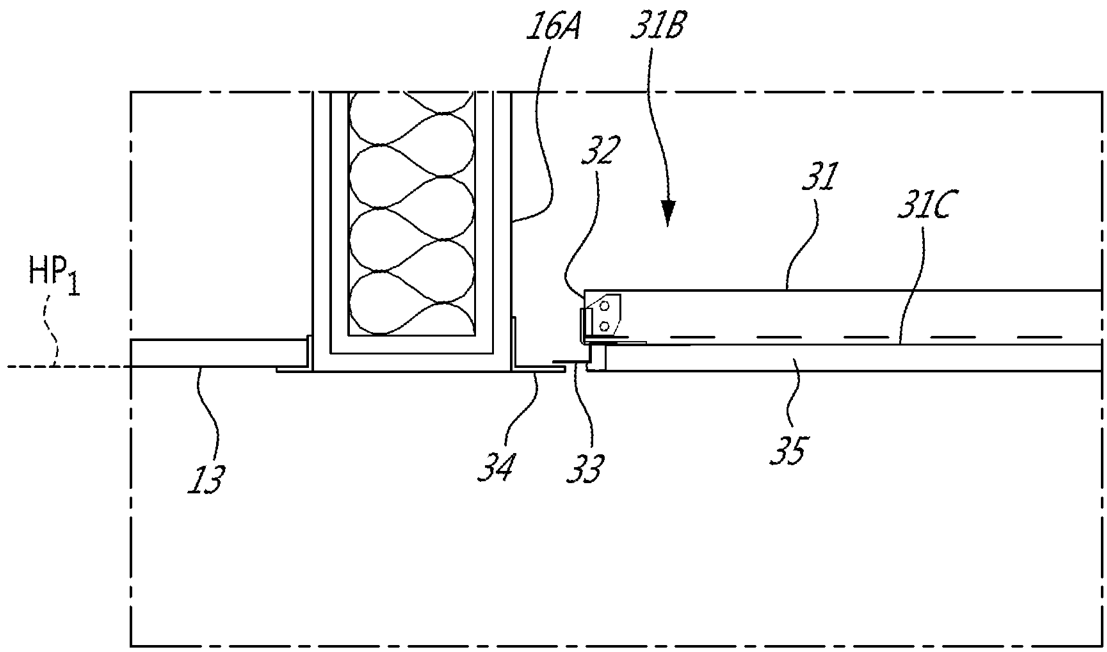
FIG. 1B is an enlarged view of portion 1B-1B of FIG. 1A.

Referring to FIGS. 1A and 1B, the second end 31B of each cover panel 31 has an outer edge 32 extending along the length of the second end 31. A seal member 33 is attached to the outer edge 32 and extends along a length thereof. The seal member 33 extends away from the outer edge 32 toward the cavity wall 16A, and therefore helps to further conceal the cavity 16. In FIG. 1B, the seal member 33 cooperates with a cavity seal member 34 extending away from each of the cavity walls 16A. More particularly, the seal member 33 overlies and overlaps the cavity seal member 34. This arrangement of fixed overlapping seal members 33,34 and/or mechanical seals can be used to form an acoustic seal between the cavity walls 16A and the outer edges 32 of the cover panels 31.

The cover panels 31 can be provided with other features to improve the overall functionality of the wall partition 10. For example, and as shown in FIGS. 1A and 1B, the floor-facing under surface 31C of each cover panel 31 includes a sound barrier tile 35 to help the cover panels 31 provide an acoustic barrier. As shown in FIG. 1B, the sound barrier tile 35 is applied to the under surface 31C of each cover panel 31 so that the sound barrier tile 35 is level with the ceiling 13 and lies within the first horizontal plane $HP_1$ when in the deployed position.

Figure 1C:
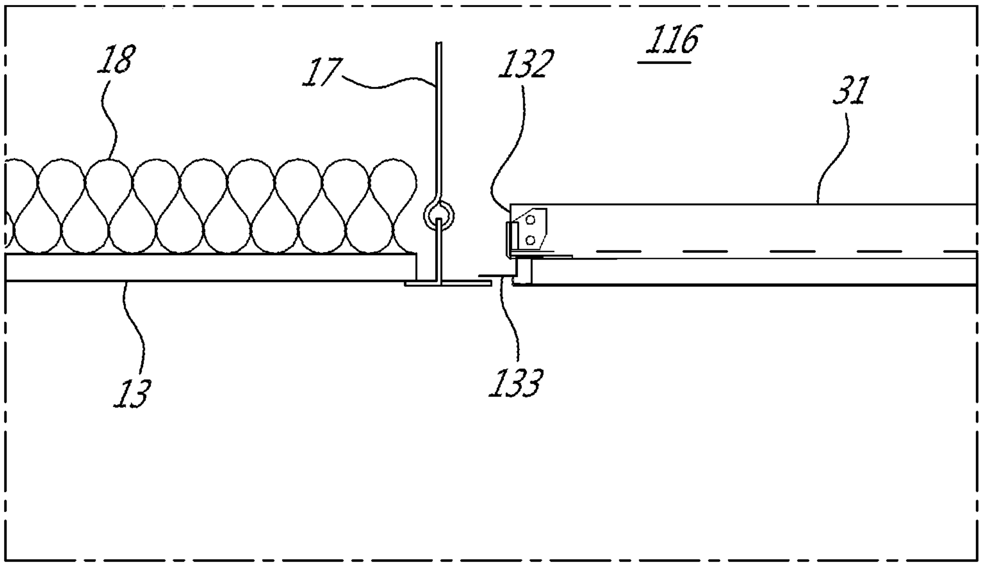
FIG. 1C is an enlarged view of another embodiment of a cavity in a ceiling.

FIG. 1C shows another embodiment of a cavity 116 in the ceiling 13 which is concealed by the cover assembly 30. In this embodiment, the ceiling 13 is suspended from the overhead structure 11 by a wire 17, and therefore there are not any vertical cavity walls 16A which extend from the ceiling 13 to the overhead structure 11 in this embodiment. The space between the ceiling 13 suspended by the wire 17 and the overhead structure 11 therefore defines the cavity 116 within the ceiling 13. In the depicted embodiment, the ceiling 13 has a continuous acoustic barrier 18 extending along an upper portion thereof. The seal member 133 is attached to the outer edge 132 of the cover panel 31 and extends along a length thereof. The seal member 133 extends away from the outer edge 132 toward the wire 17, and therefore helps to further conceal the cavity 116.

Referring to FIG. 1A, the wall partition 10 also includes a moving mechanism 40. The moving mechanism 40 causes the panel assemblies 20 and the cover assembly 30 to be displaced between the deployed and the stored positions. The moving mechanism 40 is at least partially supported by the hanger 14 attached to the overhead structure 11. The moving mechanism 40 engages each vertically-spaced support 23 and the bottom linkage 24 to move the panel assemblies 20 and the cover assembly 30 between the stored and deployed positions. When moving the panel assemblies 20, the moving mechanism 40 varies a distance between opposed ends of the same panel assembly 20 as the panel assemblies 20 are moved between the stored and deployed positions to collapse and extend the panels 21,22 of each panel assembly 20. When moving the cover assembly 30, the moving mechanism 40 vertically displaces the cover panels 31 relative to the ceiling 13 (i.e. towards and away) as the panel assemblies 20 are moved between the stored and deployed positions. The movement of the panel assemblies 20 and the cover assembly 30 will be described in greater detail below.

In the depicted embodiment, the moving mechanism 40 includes foldable link arms 41. Each link arm 41 extends between a top end 41A pivotally connected to the hanger 14, and a bottom end 41B pivotally connected to the uppermost support 23A. Each of the link arms 41 also have a pivot point or joint 42 at a longitudinal midpoint of the link arm 41 to allow the link arm 41 to foldably collapse and expand. The pivotal connection at each end 41A,41B and the pivot joint 42 allow the link arms 41 to each extend substantially vertically when in the deployed position, and to extend laterally outwardly and substantially horizontally when in the stored position.

FIG. 2 shows an embodiment of the uppermost support 23A. The uppermost support 23A has a sheave support 26 with one or more sheave pins 27. The uppermost support 23A also has upper kicker members 28 and lower kicker members 29.

The upper kicker members 28 are substantially L-shaped, and are each pivotally connected to one of the cover panels 31, for example at the pivot 28A. It can thus be appreciated that the inner or first end 31A of each cover panel 31 is pivotably connected to the uppermost support 23A. This pivotable connection allows the cover panels 31 to be manually rotated upwardly for access to the cavity 16 above the cover panel 31. Each upper kicker member 28 has a smaller upper leg 28B extending upwardly from the pivot 28A and close to an abutment member 41C of a corresponding link arm 41, and a longer inner leg 28C extending inwardly from the pivot 28A to a location adjacent a trigger element, which in the embodiment shown is the sheave pin 27. The inner leg 28C is located upwardly of the sheave pin 27. The upper kicker members 28 are shown in two positions: a rest position, and an engaged position (shown in dotted lines) where the upper leg 28B pushes against the abutment member 41C to soft start folding of the link arms 41. Each upper kicker member 28 is sized such that when the sheave support 26 and the sheave pin 27 start to move upwardly, the sheave pin 27 contacts and pushes the inner leg 28C of each upper kicker member 28 upwardly and pivots the upper kicker member 28 toward the engaged position, where each upper leg 28B pushes outwardly against the abutment member 41C of the corresponding link arm 41, thus pushing each foldable link arm 41 outwardly towards its folded position. This outward displacement of the upper legs 28B helps to ensure that the link arms 41 do not jam or fold inwardly. Stopper pins at the top end 41A of the link arms 41 (see FIG. 1A) rest against the hanger 14 and also keep the link arms 41 leaning slightly outward to prevent them from folding inwards.

The lower kicker members 29 are substantially Z-shaped, each being pivotally connected on the upper panel 21 of the connected panel assembly 20, for example by the corresponding pivot 29A. It can thus be appreciated that the uppermost of the panel assemblies 20 has a top or upper end that is pivotably connected to the uppermost support 23A. Each lower kicker member 29 has a smaller lower leg 29B extending downwardly from the pivot 29A and close to the respective upper panel 21, and a longer L-shaped upper leg 29C extending inwardly then upwardly from the pivot 29A. The upper leg 29C has an angled end 29D. Each lower kicker member 29 is sized such that when the uppermost support 23A comes close to or in contact with the hanger 14, the angled end 29D of the upper leg 29C engages a trigger element located on the hanger 14. In the embodiment shown in FIG. 1, the trigger element is a pin extending from the hanger 14, and the angled end 29D slides on the pin. The upper leg 29C is pushed inwardly and pivots the lower kicker member 29 toward its engaged position, where each lower leg 29B pushes outwardly against the corresponding upper panel 21, thus pushing the upper panel 21 of the panel assembly 20 towards its folded position.

Figure 3:
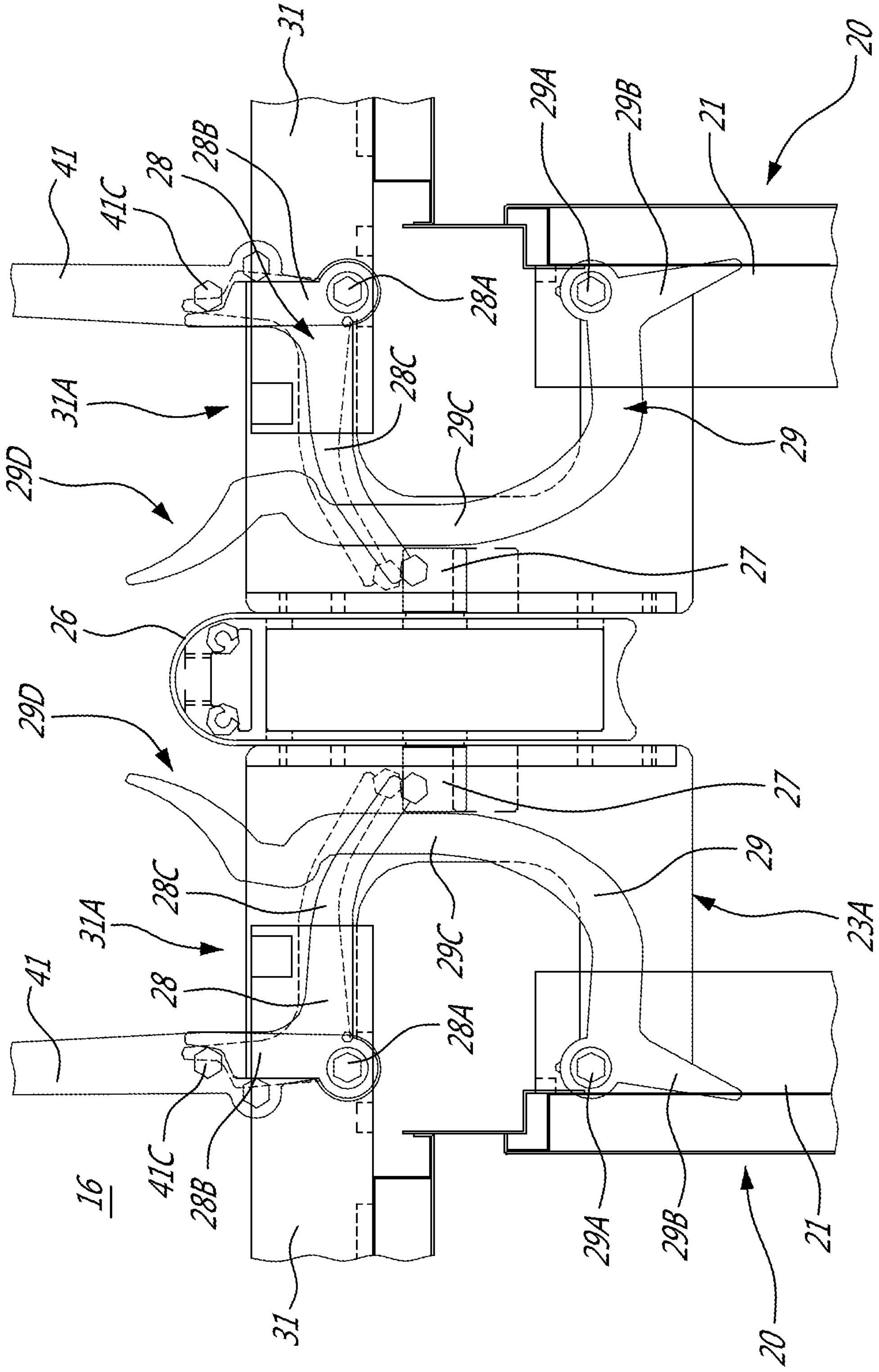
FIG. 3A is a schematic cross-sectional view of foldable link arms of the wall partition of FIG. 1A, shown between a deployed position and a stored position.
FIG. 3B is a schematic cross-sectional view of the foldable link arms of FIG. 3A, shown in the stored position.
Figure 3A:
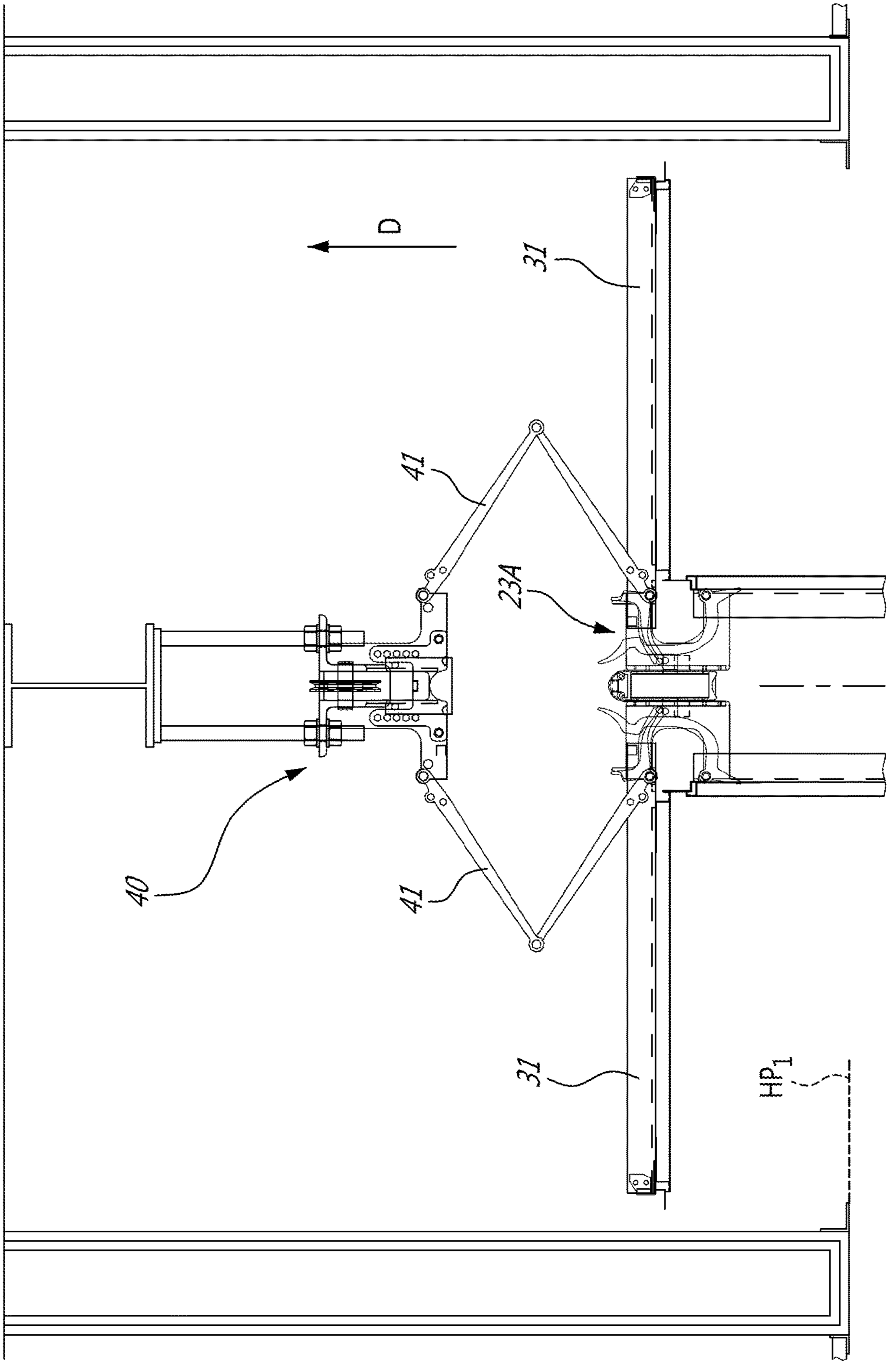
Figure 3B:
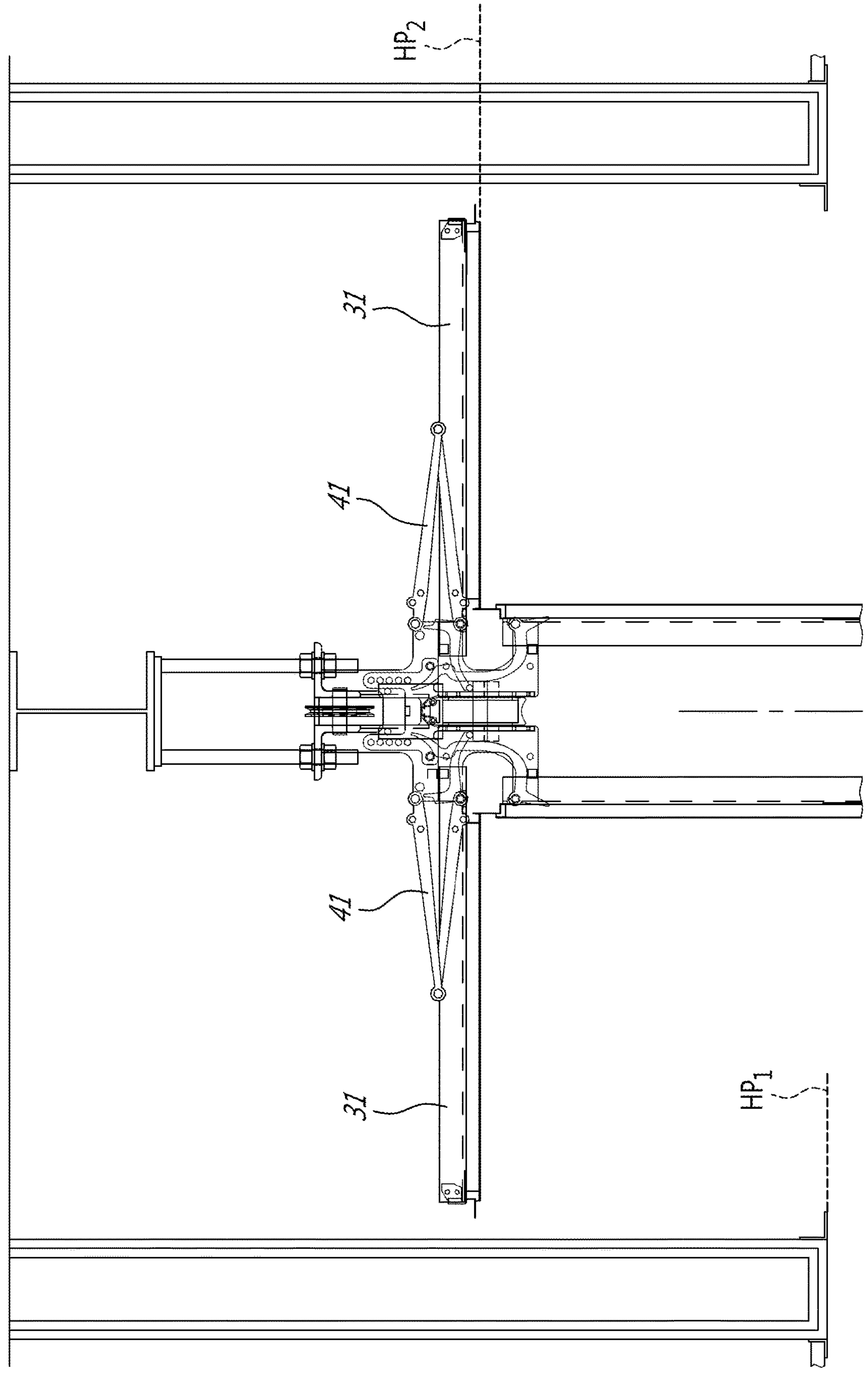

FIGS. 3A and 3B show the transition of the foldable link arms 41 between the deployed and stored positions. In FIG. 3A, the folding of the link arms 41 described above has begun. As the moving mechanism 40 displaces the uppermost support 23A along upward direction D, the cover panels 31 are raised upward as well from the first horizontal plane $HP_1$. The upward movement of the cover panels 31 along direction D eventually stops, as shown in FIG. 3B. In this stored position, the foldable link arms 41 extend laterally outwardly. As shown in the stored position of FIG. 3B, the cover panels 31 extend in the second horizontal plane $HP_2$ that is higher than the first horizontal plane $HP_1$. In the depicted embodiment, the cover panels 31 remain substantially horizontal while being vertically displaced by the moving mechanism 40 between the stored and deployed positions.

Figure 4A:
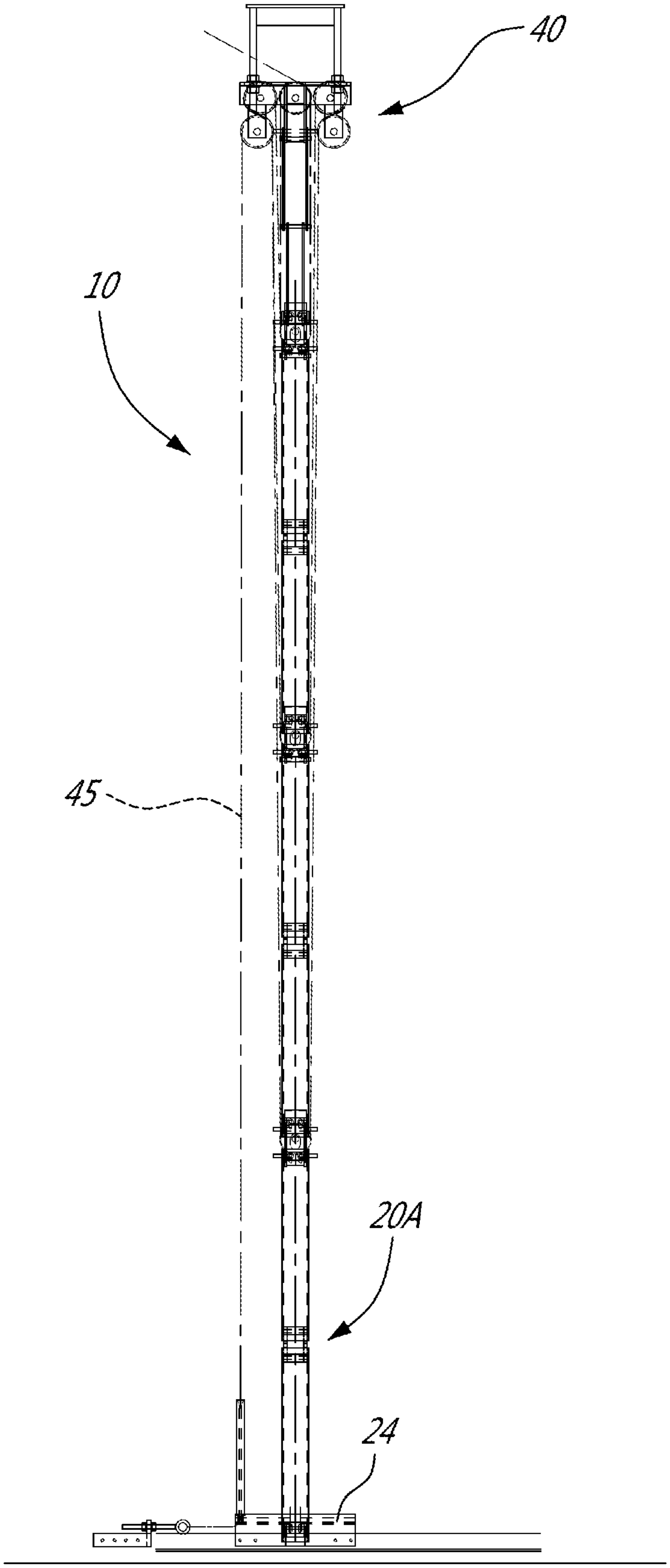
FIG. 4A is a side cross-sectional view of the wall partition of FIG. 1A.
Figure 4B:
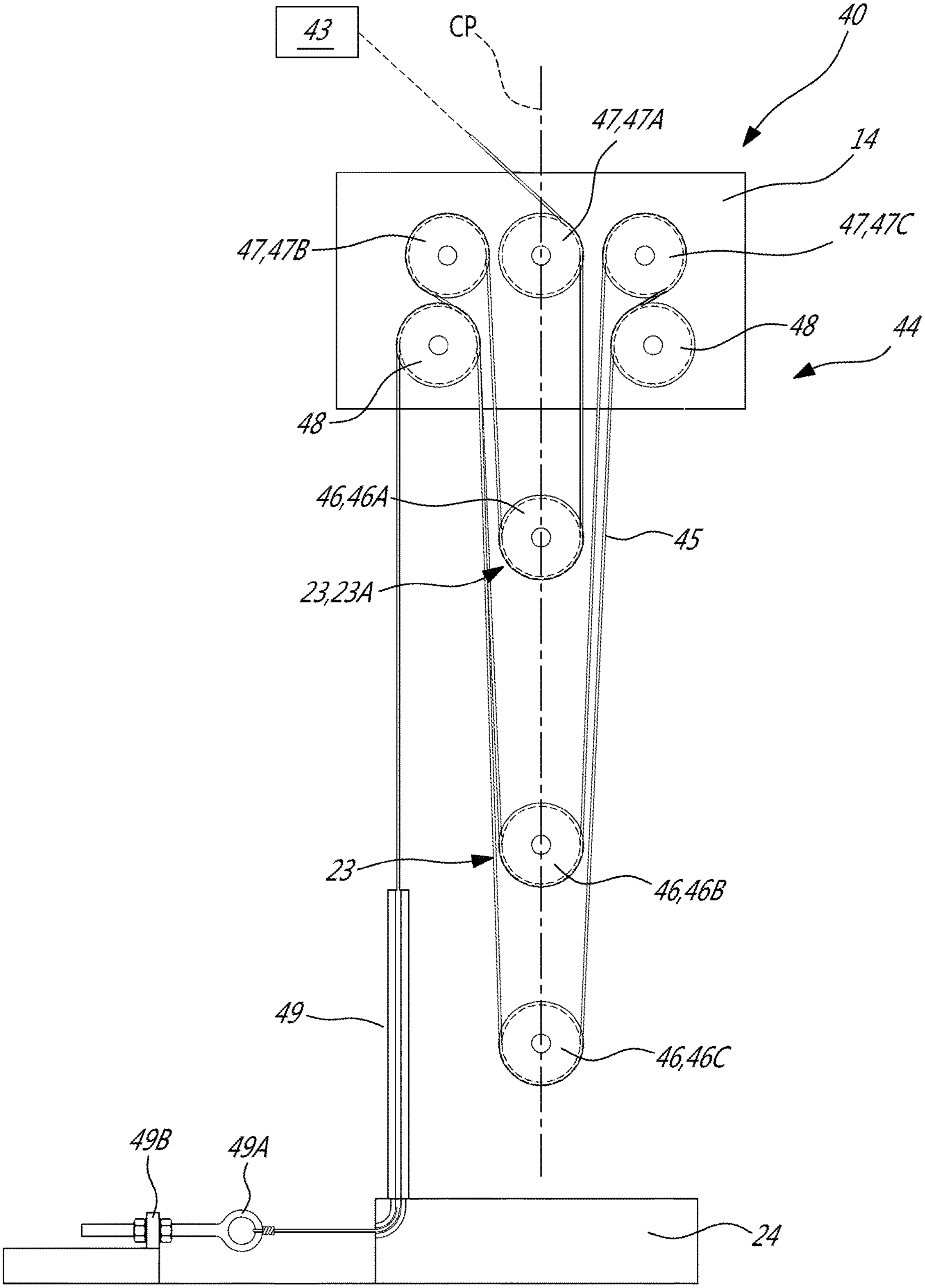
FIG. 4B is a schematic view of a cable and pulley assembly of the wall partition of FIG. 1A in accordance with a particular embodiment.

FIGS. 4A and 4B show an embodiment of the moving mechanism 40. The moving mechanism 40 includes a motor 43, and a cable and pulley assembly 44 which includes a cable 45 operatively connected to the motor 43 which selectively applies tension thereto and releases tension therefrom and a plurality of pulleys engaged to the cable 45.

The plurality of pulleys includes support pulleys 46 rotationally retained on each of the supports 23, and a plurality of hanger pulleys 47 rotationally retained on the hanger 14. In the embodiment shown, three support pulleys 46 and three hanger pulleys 47 are provided, with the first hanger pulley 47A being located in between the second and third hanger pulleys 47B,47C. Stabilizing pulleys 48 are also mounted to the hanger 14 below and adjacent the second and third hanger pulleys 47B,47C. The number of hanger pulleys 47 will vary with the number of panel assemblies provided. Each pulley 46,47 is mounted for rotation about an axis. The support pulleys 46 are centered relative to the central plane CP of the wall partition 10.

In the particular embodiment of FIG. 4B, the cable 45 extends from the motor 43 around the first hanger pulley 47A, then downwardly to the support pulley 46A of the uppermost support 23A. The cable 45 then extends around the upper support pulley 46A and upwardly to and around the second hanger pulley 47B, then downwardly between the second hanger pulley 47B and the stabilizing pulley 48, to the support pulley 46B of another support 23. The cable 45 then extends around the support pulley 46B and upwardly to and around the third hanger pulley 47C, then downwardly between the third hanger pulley 47C and the other stabilizing pulley 48, to the support pulley 46C of another support 23. The cable 45 extends from the support pulley 46C upward to the stabilizing pulley 48 and then down to the bottom linkage 24 where it is fixed. The bottom portion of the cable 45 extends through a hollow stabilizer rod 49 extending vertically upwardly from one end of the bottom linkage 24. The end of the cable 45 is attached to a ring-shaped head 49A of a horizontal threaded rod threadingly engaged with a securing member 49B fixed to the bottom linkage 24. The lowermost panel assembly 20A may include an added weight (ballast) to assist in obtaining the desired folding sequence, such as the one further described below.

Figure 5A:
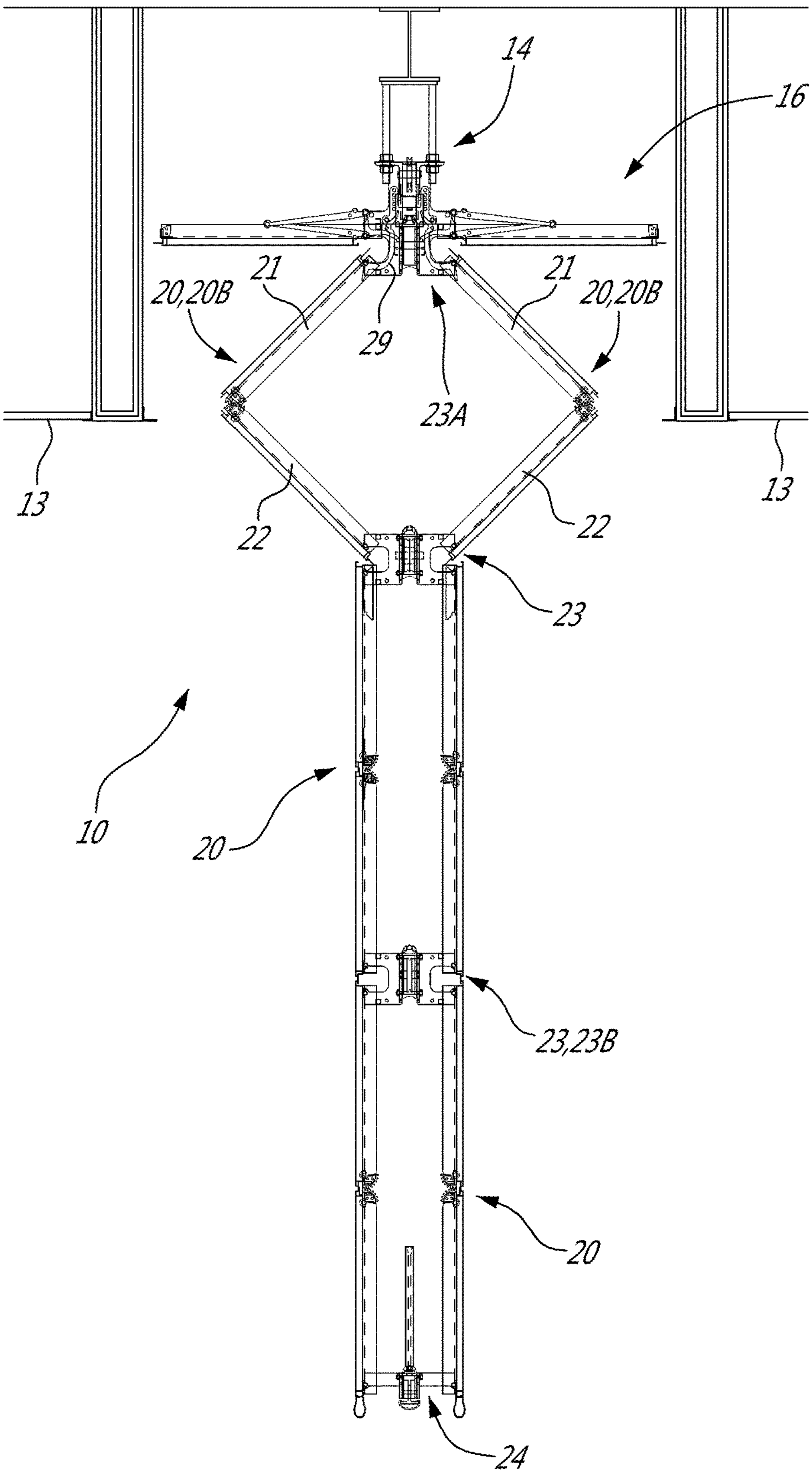
FIGS. 5A-5D are schematic cross-sectional views of the wall partition of FIG. 1A showing a folding sequence thereof.

Referring now to FIGS. 5A to 5D, the folding and unfolding of the wall partition 10 will be described in further detail. When it is desired to move the wall partition 10 from the deployed position in which the wall partition 10 is unfolded, straight and extends vertically downwardly from the ceiling structure to the floor 12 (as shown in FIG. 1) to the stored position in which the wall partition 10 is raised and stored within the cavity 16 in the ceiling 13 (FIG. 5D), the motor is activated so that the cable(s) are simultaneously and equally drawn. As seen in FIG. 5A, the pulley of the uppermost support 23A is displaced upwardly first, since the tension in the cable required to lift the uppermost support 23A is less than the tension required to reduce the distance between the two supports 23, or between the lowermost support 23B and the bottom linkage 24, due to the configuration of the cable and pulley assembly and/or the relative weights of the panel assemblies 20. As the uppermost support 23A is displaced upward, the pins of the hanger 14 engage the lower kicker member 29 of the uppermost support 23A, which assist in the folding motion of the panels 21,22 of the uppermost panel assemblies 20B and provide for a soft start of their folding motion. The remaining supports 23 and bottom linkage 24 move upwardly while maintaining constant the distance between the supports 23, and between the support 23B and the bottom linkage 24, thus maintaining the other panel assemblies 20 in their deployed positions as the uppermost panel assemblies 20B are folding.

Figure 5B:
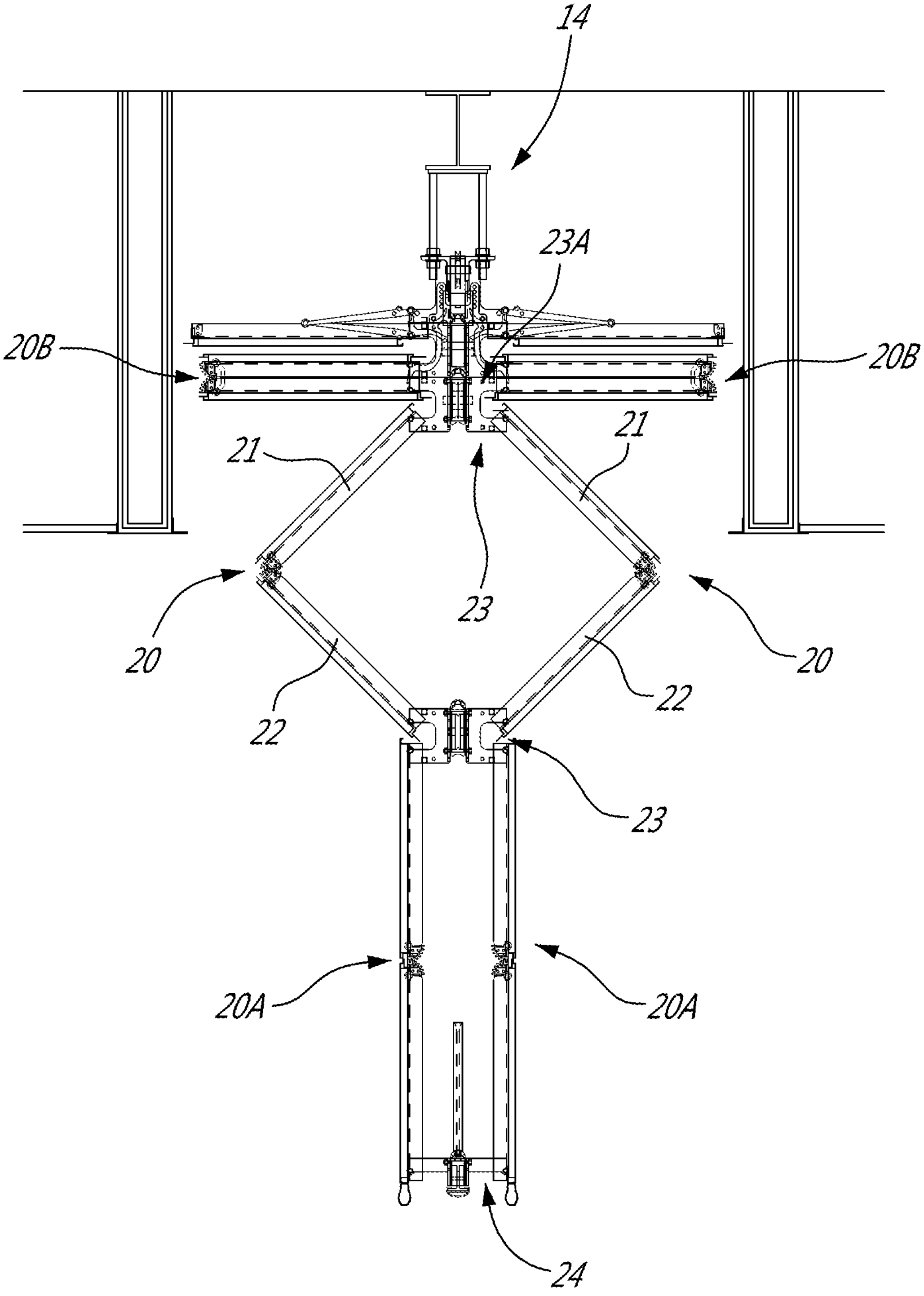

Once the uppermost support 23A has been displaced up to the hanger 14 so as to completely collapse the uppermost panel assemblies 20B in a surface-to-surface stacked relationship, as shown in FIG. 5B, the pins of the uppermost support 23A engage the lower kicker member of the next support 23, which assist in the folding motion of the panels 21,22 of the next panel assemblies 20 and provide for a soft start of their folding motion. The remaining support 23 and bottom linkage 24 move upwardly while maintaining the distance between the support 23 the bottom linkage 24 constant, thus maintaining the other panel assemblies 20 in their deployed positions.

Figure 5C:
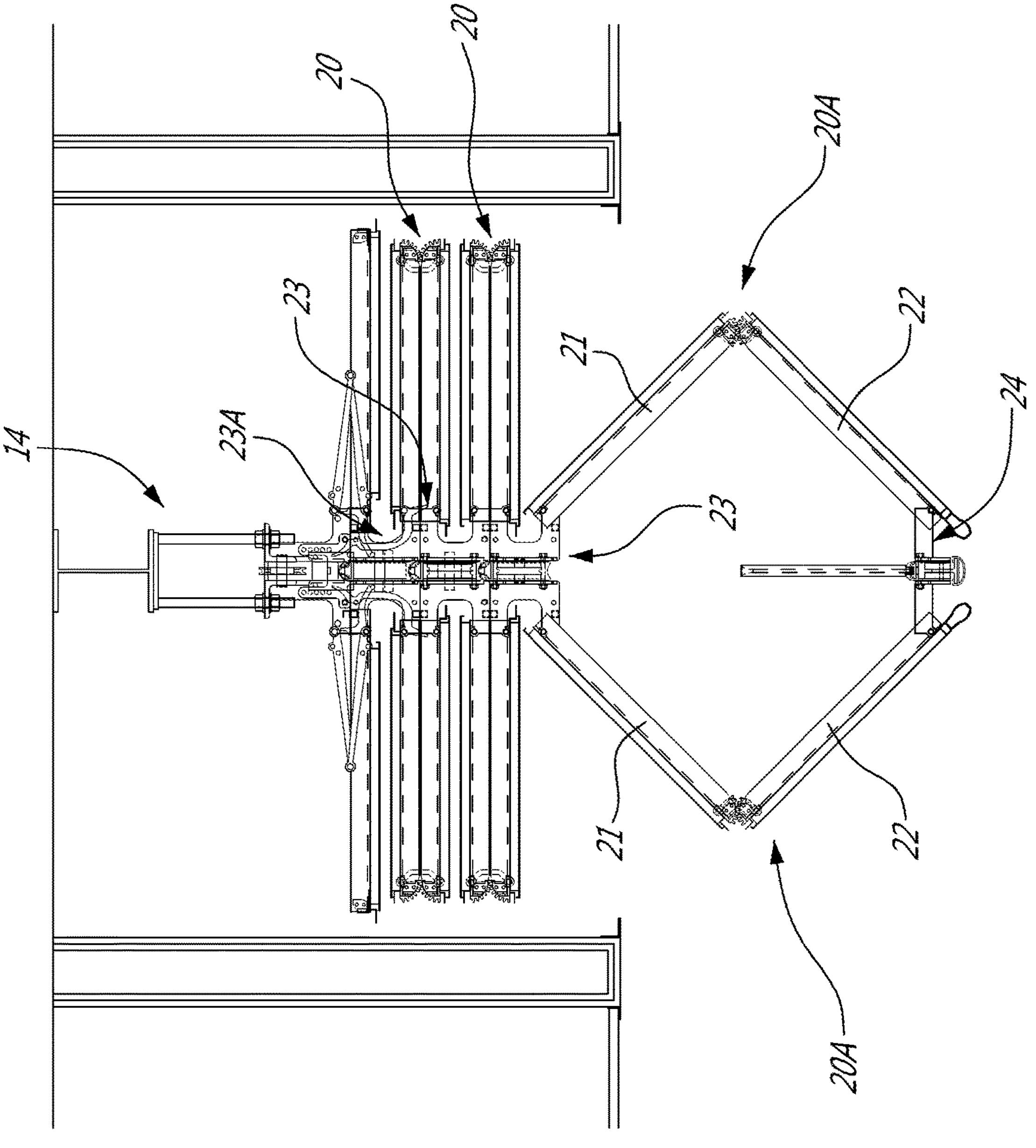
Figure 5D:
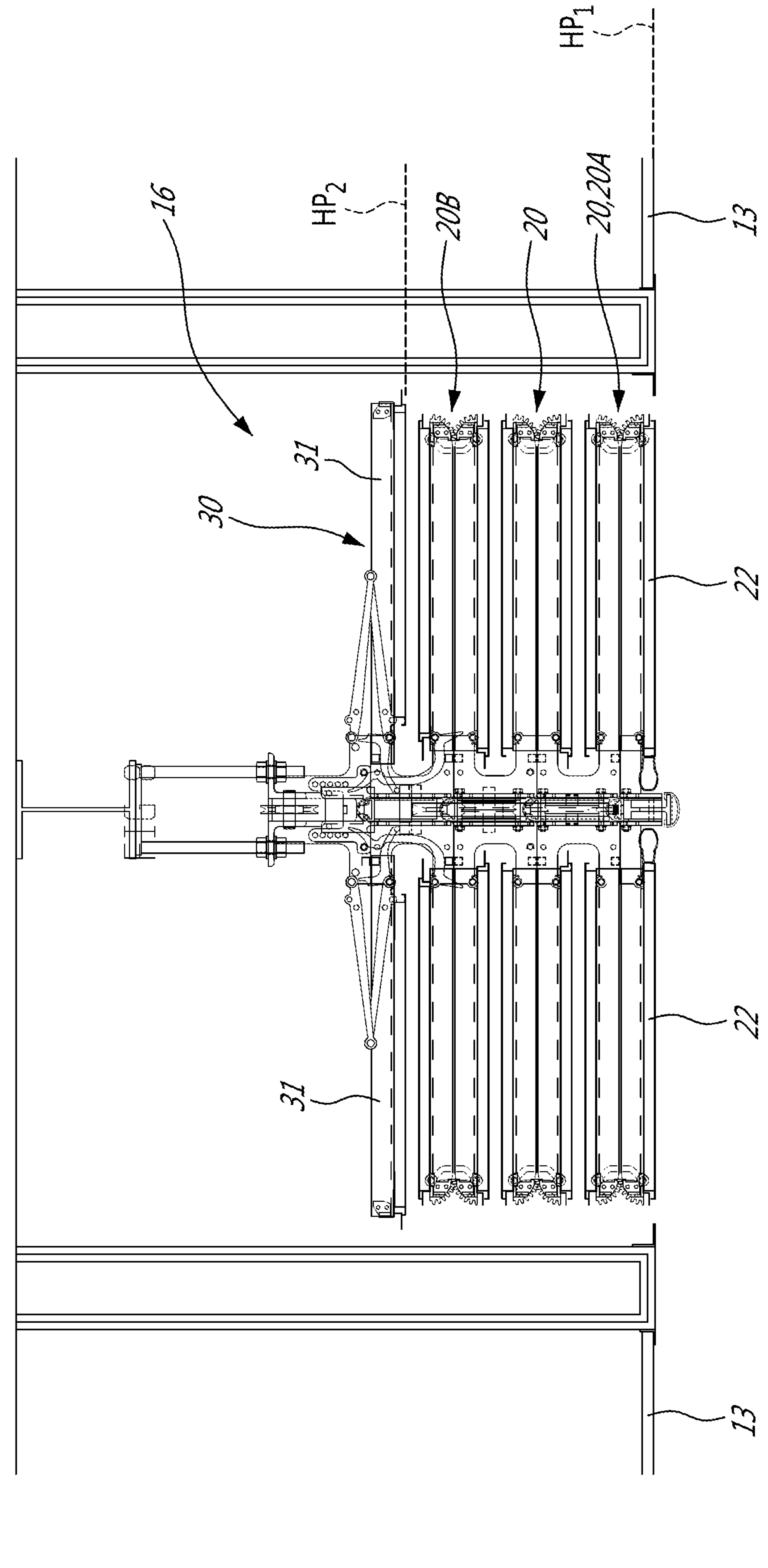

Once the uppermost support 23A and the next support 23 have been displaced up to the hanger 14 so as to completely collapse the upper panel assemblies 20 in a surface-to-surface stacked relationship, as shown in FIG. 5B, the pins of the next support 23 engage the lower kicker member of the support 23B, which assist in the folding motion of the panels 21,22 of the lowermost panel assemblies 20A and provide for a soft start of their folding motion. The bottom linkage 24 moves upwardly, folding the lowermost panel assemblies 20A, as shown in FIGS. 5C and 5D. Referring to FIG. 5D, all the panel assemblies 20 and the cover assembly 30 are now in their stored positions. The lower panels 22 of the lowermost panel assembly 20A are level with the ceiling 13, and thus with the first horizontal plane $HP_1$, to conceal the cavity 16 in the ceiling 13 when the panel assemblies 20 and the cover assembly 30 are in the stored position.

The panel assemblies 20 are unfolded in the inverse sequence. Thus, the lowermost panel assemblies 20A are first deployed followed by the next panel assemblies 20 and finally the uppermost panel assemblies 20B. Such a sequential folding may contribute to render the operation of the wall partition 10 safer, in that the lowermost panel assemblies 20A are the last to fold and first to unfold and as such do so at a height which is normally above any objects or occupants standing next thereto. The pinch points between the adjacent panels 21,22 as the panel assemblies 20 are folded and unfolded are also created relatively high and usually above room occupants. The panel assemblies 20 being folded and unfolded relatively high may also facilitate the fitting of the wall partition 10 between furniture since less clearance may be required along the bottom of the wall partition 10.

In a particular embodiment, each panel assembly 20 is folded by moving its bottom end toward its top end with the top end remaining at a fixed height corresponding to its height when the wall partition 10 is completely folded, such that each panel assembly 20 is folded at the maximum height possible. Although sequential folding of the panel assemblies 20 from the top is described herein, it will be appreciated that the folding sequence of the panel assemblies 20 can be different. For example, the panel assemblies 20 can be folded symmetrically (e.g. like an accordion), randomly, and sequentially from the bottom.

Referring to FIGS. 5A to 5D, there is also disclosed a method of deploying the foldable wall partition 10. The method includes lowering the panel assemblies 20 from their position within the cavity 16. Each panel assembly 20 unfolds as it is lowered from a stacked relationship within the cavity 16, to an upright orientation. The method also includes lowering the cover panels 31 from within the cavity 16 until the cover panels 31 extend in a common horizontal plane $HP_1$ and are substantially coplanar with the ceiling 13 to conceal the cavity 16.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A method of deploying a foldable wall partition stored within a cavity of a ceiling, comprising:
- lowering foldable panel assemblies from the cavity via a moving mechanism, the moving mechanism including a hanger and link arms operatively coupling the panel assemblies to the hanger, each panel assembly unfolding from a stacked relationship within the cavity to an upright orientation while being lowered from the cavity; and
- lowering cover panels from a stored position within the cavity until the cover panels are disposed in a deployed position, the cover panels include at least two cover panel rows that are horizontally spaced apart within the cavity, the at least two cover panel rows being respectively displaced between the stored position and the deployed position, the at least two cover panel rows of the cover panels, when in the deployed position, extending in a common horizontal plane and being substantially coplanar with the ceiling to conceal the cavity therein;
- wherein the link arms and the cover panels are independently pivotable relative to each other to provide access to the cavity.

2. The method as defined in claim 1, wherein lowering the cover panels includes lowering the cover panels from the stored position to the deployed position while maintaining the cover panels in a substantially horizontal orientation.

3. The method as defined in claim 1, wherein the cover panels extend in a second horizontal plane when disposed in the stored position, the second horizontal plane being substantially parallel to and higher than the common horizontal plane.

4. The method as defined in claim 1, wherein lowering the cover panels includes positioning distal ends of the cover panels proximal to, and spaced horizontally away from, a wall in the ceiling defining the cavity.

5. The method as defined in claim 1, wherein lowering the cover panels includes acoustically sealing the cavity with the cover panels extending in the common horizontal plane.

6. The method as defined in claim 1, wherein lowering the foldable panel assemblies includes lowering panels of at least one of the panel assemblies to be in the upright orientation while maintaining the panels of at least another one of the panel assemblies in the stacked relationship.

7. The method as defined in claim 1, wherein lowering the foldable panel assemblies includes lowering the panel assemblies sequentially, panels of a lowermost one of the panel assemblies being first to extend in the upright orientation, and panels of the panel assembly immediately above the lowermost panel assembly being next to extend in the upright orientation, wherein a sequential deployment is repeated until the panels of an uppermost one of the panel assemblies extend in the upright orientation.

8. The method as defined in claim 1, wherein lowering the foldable panel assemblies includes unfolding panels of the panel assemblies from the stacked relationship to the upright orientation adjacent to the ceiling.

9. The method as defined in claim 1, wherein lowering the foldable panel assemblies includes transitioning the link arms from a substantially horizontally extending position in the stored position to a substantially vertically extending position in the deployed position.

* * * * *